United States Patent Office 3,652,592
Patented Mar. 28, 1972

3,652,592
2-HALO-4-OXO-4,5,6,7-TETRAHYDROINDOLES AND METHODS OF PREPARING SAME
William Alan Remers, Suffern, N.Y., and Martin Joseph Weiss, Oradell, N.J., assignors to American Cyanamid Company, Stamford, Conn.
No Drawing. Filed Jan. 6, 1970, Ser. No. 1,041
Int. Cl. C07d 24/54
U.S. Cl. 260—326.16
2 Claims

ABSTRACT OF THE DISCLOSURE

This disclosure describes compounds of the class of 2-halo-4-oxo-4,5,6,7-tetrahydroindoles useful as analgesic agents.

BRIEF SUMMARY OF THE INVENTION

This invention relates to new organic compounds and, more particularly, is concerned with 2-bromo-4-oxo-4,5,6,7-tetrahydroindole, 2,3 - dichloro-4-oxo-4,5,6,7-tetrahydroindole, and 2,3-dibromo-4-oxo-4,5,6,7-tetrahydroindole and with methods of preparing these compounds.

DETAILED DESCRIPTION OF THE INVENTION

The novel compounds of the present invention are white crystalline materials having characteristic melting points and absorption spectra and which may be purified by recrystallization from common organic solvents such as methanol, chloroform, or n-hexane. They are appreciably soluble in many organic solvents such as ethanol, acetone, dimethylformamide, and the like but are sparingly soluble in water.

The novel compounds of the present invention are active analgesics when measured by the "writhing syndrome" test for analgesic activity as described by Siegmund et al., Proc. Soc. Exptl. Biol. Med., vol. 9, p. 729 (1957), with modifications. This method is based upon the reduction of the number of writhes following the intraperitoneal injection of one mg. of phenyl-p-quinone per kg. of body weight in male Swiss albino mice weighing 15–25 grams per mouse. The syndrome is characterized by intermittent contractions of the abdomen, twisting and turning of the trunk, and extension of the hind legs beginning 3 to 5 minutes after injection of the phenyl-p-quinone. The test compound is administered orally to groups of two mice each 30 minutes before injection of the phenyl-p-quinone. The total number of writhes exhibited by each group of mice is recorded for a 3 minute period commencing 15 minutes after injection of the phenyl-p-quinone. A compound is considered active if it reduces the total number of writhes in two test mice from a control value of approximately 30 per pair to a value of 18 or less. In a representative operation, and merely by way of illustration, 2-bromo-4-oxo-4,5,6,7-tetrahydroindole and 2,3-dibromo-4-oxo-4,5,6,7-tetrahydroindole both showed analgesic activity when tested by this procedure at an oral dose of 200 mg./kg. of body weight. If desired, the median effective dose ($ED_{50}$) for any particular compound may be calculated from the results obtained by repeating this test in multiple groups of two mice each at each of several graded dose levels.

When mixed with suitable excipients or diluents, the compounds of this invention can be prepared as pills, capsules, tablets, powders, solutions, suspensions, and the like for unit dosage and to simplify administration. The novel compounds of the present invention may also be administered in combination therapy with salicylates such as aspirin and the like.

The invention will be described in greater detail in conjunction with the following specific examples.

Example 1

Preparation of 2-bromo-4-oxo - 4,5,6,7 - tetrahydroindole.—A solution of 270 mg. of 4-oxo-4,5,6,7-tetrahydroindole [Ann. Chem. 655, 20 (1962)] in 150 ml. of tetrahydrofuran is treated portionwise with a solution of 752 mg. of phenyltrimethylammonium tribromide in 50 ml. of tetrahydrofuran. After two hours, the resulting mixture is filtered and the filtrate is concentrated under reduced pressure. The residue is dissolved in methylene chloride and washed with 5% sodium bicarbonate solution. Concentration of the organic layer affords the product as a crystalline solid which is washed with diethyl ether. Successive recrystallizations from chloroform-hexane, chloroform, and methanol-water affords 210 mg. of product as white crystals, M.P. 175° C.

Example 2

Preparation of 2,3-dibromo-4-oxo-4,5,6,7-tetrahydroindole.—A solution of 2.7 g. of 4-oxo-4,5,6,7-tetrahydroindole [Ann. Chem. 655, 20 (1962)] in 30 ml. of warm acetic acid is treated dropwise with 3.2 g. of bromine. The resulting mixture is treated with 70 ml. of water and the white crystalline product is collected and dried in air. After recrystallizations from methylene chloride-hexane and from methanol it has melting point 175° C. with decomposition.

Example 3

Preparation of 2,3-dichloro-4-oxo-4,5,6,7-tetrahydroindole.—The procedure of Example 2 is repeated, substituting an equimolar amount of chlorine for the bromine employed in that example. The gaseous chlorine is introduced into the reaction solution by means of a gas dispersion tube until the appropriate amount by weight is absorbed. There is thus obtained the 2,3-dichloro-4-oxo-4,5,6,7-tetrahydroindole.

We claim:
1. The compound 2,3-dichloro-4-oxo-4,5,6,7-tetrahydroindole.
2. The compound 2,2-dibromo-4-oxo-4,5,6,7-tetrahydroindole.

References Cited

Schoen et al., Chem. Abs. 69: 43796f (1968), abs. of British Pat. No. 1,108,579.

ALEX MAZEL, Primary Examiner

J. A. NARCAVAGE, Assistant Examiner

U.S. Cl. X.R.
424—274